US 8,218,689 B2

(12) United States Patent
Suzuki

(10) Patent No.: US 8,218,689 B2
(45) Date of Patent: Jul. 10, 2012

(54) WIRELESS COMMUNICATION DEVICE AND MOBILE STATION

(75) Inventor: Masaaki Suzuki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1676 days.

(21) Appl. No.: 11/046,679

(22) Filed: Feb. 1, 2005

(65) Prior Publication Data

US 2006/0013341 A1 Jan. 19, 2006

(30) Foreign Application Priority Data

Jul. 13, 2004 (JP) ................................. 2004-205938

(51) Int. Cl.
*H04L 27/06* (2006.01)
*H03K 9/00* (2006.01)
*H04B 7/08* (2006.01)
(52) U.S. Cl. .................... 375/340; 375/316; 455/132
(58) Field of Classification Search .................. 375/340, 375/316; 455/132
See application file for complete search history.

(56) References Cited

U.S. PATENT DOCUMENTS

| 5,596,720 | A * | 1/1997 | Hamada et al. ............... 709/206 |
| 5,740,285 | A * | 4/1998 | Bloomberg et al. ........... 382/299 |
| 6,088,307 | A * | 7/2000 | Fushimi et al. .............. 369/44.13 |
| 6,212,662 | B1 * | 4/2001 | Hekstra et al. ................ 714/778 |
| 2001/0034209 | A1 * | 10/2001 | Tong et al. ....................... 455/69 |
| 2002/0145985 | A1 * | 10/2002 | Love et al. ..................... 370/328 |
| 2003/0028843 | A1 * | 2/2003 | Chang et al. ................... 714/786 |
| 2003/0118031 | A1 * | 6/2003 | Classon et al. ............. 370/395.54 |
| 2003/0233610 | A1 * | 12/2003 | Naoi .............................. 714/758 |
| 2004/0228307 | A1 * | 11/2004 | Nishimura ..................... 370/335 |
| 2005/0013028 | A1 * | 1/2005 | Lee et al. ......................... 360/46 |

FOREIGN PATENT DOCUMENTS

| EP | 0 924 890 | 6/1999 |
| EP | 1 204 210 | 5/2002 |
| WO | 01/37433 | 5/2001 |

OTHER PUBLICATIONS

Fontenelle S. et al.; "Blind Recognition of Retransmitted Packets for HARQ System"; Wireless Communications and Networking, 2003., vol. 2, Mar. 16, 2003-Mar. 20, 2003, pp. 838-842, XP010639876; IEEE Piscataway, NJ, USA, DOI: 10. 1109/WCNC.2003.1200480 ISBN: 978-0-7803-7700-4; [Ref.: Partial European Search Report mailed Oct. 14, 2010].

Qingchun Chen et al.; On the performance of truncated type III hybrid ARQ scheme with code combining; Wireless Communications and Mobile Computing, vol. 3, No. 5, Aug. 2003; pp. 641-658, XP002599609 Wiley UK ISSN: 1530-8669 DOI: 10.1002/WCM. 147. [Ref.: Partial European Search Report mailed Oct. 14, 2010].

Partial European Search Report and written opinion issued by the European Patent Office for corresponding European Patent No. 05002672.3, dated Oct. 14, 2010.

European Search Report issued for corresponding European Patent Application No. 05002672.3, dated Feb. 15, 2011.

* cited by examiner

*Primary Examiner* — David C. Payne
*Assistant Examiner* — Brian J Stevens
(74) *Attorney, Agent, or Firm* — Myers Wolin, LLC

(57) ABSTRACT

The occurrence of reception errors due to failure to discriminate between a new transmission and a retransmission is reduced by a wireless communication comprising a storage unit operable to store received data; and a decoding unit operable to obtain a first decoding result by decoding new received data, which is not combined with the stored received data, and which obtains a second decoding result by decoding the new received data, which is combined with the stored received data.

5 Claims, 5 Drawing Sheets

WIRELESS COMMUNICATION DEVICE AND MOBILE STATION

CROSS REFERENCE TO RELATED APPLICATION

This application is related to and claims priority to Japanese Application No. 2004-205938 filed Jul. 13, 2004 in the Japanese Patent Office, the contents of which are incorporated by reference herein.

BACKGROUND OF THE INVENTION

1. Field of the Invention

The present invention relates to a wireless communication device and mobile station, and in particular to a system using wireless communication devices and mobile stations is the W-CDMA (UMTS) mobile communication system.

2. Description of the Related Art

Standardization is currently progressing within the 3GPP (3rd Generation Partnership Project) on the W-CDMA (UMTS) scheme, one scheme for a third generation mobile communication systems. HSDPA (High Speed Downlink Packet Access), which provides a maximum transmission speed of approximately 14 Mbps, has been specified as one theme of the standardization.

HSDPA is characterized in that it employs an adaptive coding modulation scheme, for example, switching adaptively between a QPSK modulation scheme and a 16-QAM scheme depending on the wireless environment between the base station and mobile station.

HSDPA furthermore employs an H-ARQ (Hybrid Automatic Repeat reQuest) scheme. Under H-ARQ, when a mobile station detects an error in the data received from the base station, a retransmission request is made from the mobile station to the base station, and the data is retransmitted from the base station. The mobile station then performs error correction decoding using both the already received data and the retransmitted received data. Thus, H-ARQ increases the benefits of error correction decoding and reduces the number of retransmissions by effectively using already received data.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both downlink (i.e., in the direction from the base station to the mobile station) common channels; HS-SCCH is a control channel for transmitting various parameters relating to the data transmitted on HS-PDSCH. The various parameters include, for instance, modulation type information indicating what modulation scheme is to be used for transmitting data on HS-PDSCH, spreading code assignment numbers (code numbers), information on the pattern of rate matching performed on the transmitted data, and the like.

HS-DPCCH, on the other hand, is a dedicated uplink control channel, in the direction from the mobile station to the base station; it is used by a mobile station to transmit ACK and NACK signals, depending on whether the data received via HS-PDSCH was received properly or not. If the mobile station failed to receive data (when the received data has a CRC error or the like), a NACK signal would be transmitted from the mobile station to the base station, whereupon the base station would execute retransmission control.

The HS-DPCCH is also used by the mobile station to periodically transmit to the base station the results of determination of the reception quality (e.g., SIR) of the signal received from the base station as a CQI (Channel Quality Indicator). The base station evaluates the goodness of the downlink wireless environment based on the received CQIs, and switches for instance to a modulation scheme that allows data to be transmitted at higher speeds if the environment is good. If the wireless environment is not good, the base station adaptively switches to a modulation scheme whereby data is transmitted at lower speed, etc.

Channel Structure

Next, the channel arrangement involved in HSDPA will be explained.

FIG. 1 is a diagram illustrating the channel arrangement involved in HSDPA. Since W-CDMA employs a code division multiplexing scheme, each channel is separated by means of a code.

First, the channels which have not been explained will be briefly described.

CPICH (Common Pilot Channel) and P-CCPCH (Primary Common Control Physical Channel) are respectively downlink common channels.

CPICH is a channel used by the mobile station as a timing reference for channel estimation, cell search and other downlink physical channels within the same cell; it is a channel used to transmit the so-called pilot signal. P-CCPCH is a channel for transmitting broadcast information.

Next, the timing relationship of the various channels will be described.

As shown in FIG. 1, each channel comprises one frame (10 ms) of 15 slots. As explained earlier, CPICH is used as a reference for other channels, so the head of the frame of P-CCPCH and HS-SCCH is aligned with the head of the CPICH frame. Here, the head of the HS-PDSCH frame is delayed by two slots relative to HS-SCCH and the like. This is in order to provide advance notice, via the HS-SCCH, of the demodulation type information and spreading code information which the mobile station needs in order to perform demodulation of the HS-PDSCH. Therefore, the mobile station selects the appropriate demodulation scheme and despreading code according to the information provided in advance on HS-SCCH to execute the processing of HS-PDSCH demodulation, etc.

Furthermore, HS-SCCH and HS-PDSCH comprise subframes of three slots.

The above was a simple description of the HSDPA channel arrangement.

Next, the content and coding procedure of the data transmitted on HS-SCCH will be described.

Data Transmitted on HS-SCCH

The following data are transmitted on HS-SCCH. Each datum is used for reception processing of HS-PDSCH, on which transmission takes place with a two slot delay.

(1) Xccs (Channelization Code Set information)
(2) Xms (Modulation Scheme information)
(3) Xtbs (Transport Block Size information)
(4) Xhap (Hybrid ARQ Process information)
(5) Xrv (Redundancy and constellation Version)
(6) Xnd (New Data indicator)
(7) Xue (User Equipment identity)

(1) through (7) will be described.

(1), Xccs, is a datum indicating the spreading code used for transmitting data on HS-PDSCH (e.g., a datum indicating a combination of multicode number and code offset), and consists of 7 bits.

(2), Xms, is a datum indicating whether the modulation scheme used on HS-PDSCH is QPSK or 16-QAM, and consists of 1 bit.

(3), Xtbs, is a datum used for computing the transport block size of the data transmitted on HS-PDSCH (the size of the data transmitted in one subframe of HS-PDSCH), and consists of 6 bits.

(4), Xhap, is a datum indicating the H-ARQ process number, and consists of 3 bits. A base station basically cannot determine whether or not a mobile station was able to receive data until the base station receives an ACK or NACK. However, if it were to wait until the ACK or NACK was received before transmitting a new data block, the transmission efficiency would decrease. Thus, in order to enable transmission of new data blocks before receiving an ACK or NACK, a process number is defined for each data block transmitted in subframes, and the mobile station is made to perform reception processing in pieces based on the process number. Namely, under the condition that the base station will assign the same process number when performing retransmission as the process number assigned to the previously sent transport block, each transport block is given the corresponding process number, which is transmitted in advance via HS-SCCH as the Xhap.

Therefore, the mobile station classifies data received via the HS-PDSCH based on the received Xhap, and performs discrimination of new transmission or retransmission based on Xnd, which will be described below, in the stream of data for which the same process number was indicated via HS-SCCH, as well as combining new data and resent data, etc. (H-ARQ processing, etc.).

(5), Xrv, is a datum which indicates the redundancy version (RV) parameter (s, r) and constellation version parameter (b) for HS-PDSCH retransmission, and consists of 3 bits.

For Xrv, there is a first technique (Incremental Redundancy) whereby the parameters are updated for new transmission and retransmission, and a second technique (Chase Combining) whereby the parameters are not changed for new transmission or retransmission.

In the first technique, the puncture pattern and the like varies, so the bits to be transmitted change between new transmission and retransmission, while in the second technique, they do not change.

(6), Xnd, is a datum indicating whether a block transmitted on HS-PDSCH is a new block or a resent block, and consists of one bit. For example, when transmitting a new block, it would be switched from 0 to 1 or from 1 to 0, while when retransmitting, the same value would be used as before, without switching.

For example, when performing a sequence of new transmission, retransmission, new transmission, retransmission, retransmission; new transmission, the Xnd would change in the order 1, 1, 0, 0, 0, 1.

(7), Xue, is a datum indicating the identification information of the mobile station, and consists of 16 bits.

FIG. 2 is the structure of the HS-SCCH coding unit.

In FIG. 2, 1 is a coding unit, 2 is a rate matching unit, 3 is a multiplication unit, 4 is a CRC computation unit, 5 is a multiplication unit, 6 is a coding unit, 7 is a rate matching unit, 8 is a coding unit, and 9 is a rate matching unit.

The operation of each block will be described next.

(1) Xccs ($x1,1$-$x1,7$), represented in 7 bits, and (2) Xms ($x1,8$), represented in 1 bit, are inputted into the coding unit 1 as a datum with a total of 8 bits. Here, the first half of the subscript signifies that this relates to data transmitted in the first slot, while the number of the second half, separated by a comma (,), signifies the number of the bit.

Now, the coding unit 1 appends 8 tail bits to the inputted data, and performs convolutional coding at a code rate of $1;3$ on a total of 16 bits. Thus, the encoded data becomes a total of 48 bits, and is given to the rate matching unit 2 as $z1,1$-$z1,48$. The rate matching unit 2 performs puncturing, repetition, etc. of specific bits, and outputs the bits adjusted to the number of bits (assumed to 40 here) that will fit into the first slot ($r1,1$-$r1,40$).

Data from the rate matching unit 2 are multiplied by $c1$-$c40$ in the multiplication unit 3 and outputted as $s1,1$-$s1,40$, and are transmitted in the first slot (first part) of HS-SCCH in FIG. 1, which is the slot at the head of a subframe.

Here, $c1$-$c40$ are obtained by adding 8 tail bits to the data from (7) Xue (Xue1-Xue16) and then convolutionally encoding, in coding unit 8, it at a coding rate of $1;2$ to obtain $b1$-$b48$, which are further subjected, in rate matching unit 9, to the same bit adjustment as in the rate matching unit 2.

Furthermore, the 6-bit (3) Xtbs ($x2,1$-$x2,6$), 3-bit (4) Xhap ($x2,7$-$x2,9$), 3-bit (5) Xrv ($x2,10$-$x2,12$) and 1-bit (6) Xnd ($x2,13$), are inputted as a total of 13 bits $y2,1$-$y2,13$, with the 16 bits $y2,14$-$y2,29$ further added for a total of 29 bits, $y2,1$-$y2,29$, into the coding unit 6.

Here, $y2,14$-$y2,29$ are obtained by performing CRC computation on the total of 21 bits of (1) through (6) in the CRC computation unit 4, and multiplying the results of that computation, $c1$-$c16$, by (7) Xue (xue1-xue16).

The $y2,1$-$y2,29$ inputted into the coding unit 6 have 8 tail bits added thereto and are convolutionally encoded at a coding rate of $1;3$ and inputted as 111 bits, $x2,1$-$z2,111$, into the rate matching unit 7.

The rate matching unit 7 outputs 80 bits, $r2,1$-$r2,80$ by means of processing such as the aforementioned puncturing, and these $r2,1$-$r2,80$ are transmitted in the second and third slot (second part) of the one subframe on HS-SCCH in FIG. 1.

As described above, the data of (1) and (2) are transmitted in a first part, while (3) through (6) are transmitted in a second part, thus being transmitted in distinctly in separate slots, but these data are subjected to a common CRC computation, with the CRC computation result being transmitted in the second part, so detection of reception error becomes possible once both the first and second part are completely received.

Furthermore, since the data transmitted in the first slot is multiplied by (7) Xue in the multiplication unit 3 after undergoing convolutional coding by the coding unit 1, when data addressed to another station is received in the first slot, the likelihood generated in the decoding process will be smaller compared to if it were addressed to this station, so a comparison of the likelihood to a reference value can reveal that the possibility of it not being addressed to this station is high.

Coding of Data Transmitted on HS-PDSCH

Next, the process leading to transmission of data via HS-PDSCH will be described using a block diagram.

FIG. 3 is a diagram which illustrates a transmission device according to the present invention.

The transmission device (wireless base station) of a W-CDMA communication system compatible with the above-described HSDPA will be described as an example transmission device. This can also be applied to transmission devices in other communication systems.

In the drawing, 10 represents a control unit which sequentially outputs the transport data (the data transmitted within one subframe) to be transmitted via HS-PDSCH, as well as controlling the various units (11 through 26, etc.). The values of (1) through (7) described in FIG. 2 are assigned by this control unit 10.

Since HS-PDSCH is a shared channel, it is allowed for successively outputted data to be addressed to different mobile stations.

11 represents a CRC attachment unit which performs a CRC computation on the successively inputted transport data (data transmitted within the same wireless frame) and attaches the CRC computation result to the tail of this transport data, and 12 represents bit scrambling unit which scrambles the transport data with the CRC computation result attached thereto in bit units to impart randomness to the transmitted data.

13 represents a code-block segmentation unit which segments (e.g., into two equal parts) the inputted bit-scrambled transport data when it exceeds a certain data length, in order to prevent increase in computational volume of the receiving side decoder due to excessive length of the data to be encoded in the following channel coding, and the like. The drawing illustrates output in a case where the inputted data length exceeded a certain data length and was divided into two equal parts (segmented into a first data block and second data block). Of course, cases where the number of segments is other than two are also possible, as are cases where the data is divided not into equal parts but into different data lengths.

14 represents a channel coding (encoding) unit which performs error correction coding separately on each segmented datum. Here, it is assumed that a turbo coder is used for the channel coding unit 14.

Therefore, the first output of the channel coding unit, for the first block, contains: the important systematic bits (U), which are the same data as the data to be coded; the first redundancy bits (U') obtained by convolutionally coding the systematic bits (U); and the second redundancy bits (U") obtained by interleaving the systematic bits and then convolutionally coding in the same manner. Likewise, the second output contains the systematic bits (U), first redundancy bits (U') and second redundancy bits (U") for the second block.

15 represents a bit separation unit which separates the first block and second block, serially inputted from the channel coding unit 14 (turbo coder), into the systemic bits (U), first redundancy bits (U') and second redundancy bits (U"), and outputs them.

16 represents a first rate matching unit which performs rate matching, e.g. puncturing, on the input data (the data of all separated blocks when separated into multiple blocks) in order to make it fit into a specific region of the following virtual buffer unit 17.

17 represents a virtual buffer unit, in which a region is set by the control unit 10 in accordance with the reception processing capacity of the mobile station to be transmitted to, and which stores data rate-matched by the first rate matching unit 16 in that region. During retransmission, the processing from the CRC attachment unit to the first rate matching unit can be omitted by outputting the stored data, but when one wishes to change the coding rate during retransmission, etc., it is preferable not to use the stored data but rather to re-output the transmission data held by the control unit. It is also possible to not provide an actual buffer for the virtual buffer unit 17 and to have the data pass through directly. In this case, resent data would be re-outputted from the control unit 10.

18 represents a second rate matching unit for adjusting the data length with control unit 10 to one that can fit inside the designated subframe; it adjusts the data length of the inputted data to the designated data length by performing puncturing and repetition on it.

This second rate matching unit 18 performs rate matching according to the previously described RV parameter.

Namely, according to the RV parameter, when s=1, rate matching is carried out so as to leave as many systematic bits as possible; on the other hand, when s=0, it is permitted for the systematic bits to be reduced and for more redundancy bits to remain. Furthermore, rate matching and puncturing are performed based on a pattern according to r.

19 represents a bit collection unit which arranged the data from the second rate matching unit 19 into a plurality of bit sequences. Namely, the data of the first block and the data of the second block are arranged according to a specific bit arrangement method to output a plurality of bit sequences serving to indicate the signal points on a phase plane. Since the 16-QAM modulation scheme is used in this example, the bit sequence consists of four bits; when using a 64-QAM modulation scheme, the bit sequence would be made six bits, and when using a QPSK modulation scheme, the bit sequence would be made two bits.

20 segments and outputs bit sequences into the same number of systems as the number of the spreading code (code number) provided by the control unit 10. Namely, it represents a physical channel segmentation unit which, when the code number in the transmission parameters provided by the control unit 10 is N, maps the inputted bits sequentially to 1 through N systems and outputs them.

21 is an interleaving unit which performs interleaving on the bit sequences of N systems and outputs them.

22 is a constellation rearrangement unit for 16-QAM, which is able to rearrange bits within, each inputted bit sequence. Bit rearrangement is carried out according to the earlier described constellation version. Examples of bit rearrangement include substituting high order and low order bits; it is preferable for bit substitution to be carried out by the same rule for multiple bit sequences.

23 is a physical channel mapping unit which maps the bit sequences of N systems to the corresponding spreading section of the following spreading unit 24.

24 is a spreading unit which comprises a plurality of spreading sections, each of which outputs the corresponding I and Q voltage based on each bit sequence of N systems, performing spreading with a different spreading code in each case and outputting the result.

25 represents a modulating unit which combines the signals spread by the spreading unit 24, and based thereon, performs amplitude phase modulation, for instance by the 16-QAM modulation scheme, amplifies by means of a variable gain amplifier, performs frequency conversion to a wireless signal, and then outputs the wireless signal to the antenna to enable transmission.

Since. HSDPA allows multiplexing of signals addressed to other mobile stations by means of spreading codes in subframes of the same timing, it is preferably to provide multiple sets of 10 through 25 and of the variable gain amplifier, etc. (which will be referred to as transmission sets), and to combine the output signals of the variable gain amplifiers, then frequency-convert them in common, and then transmit the result to the antenna. Of course, since separation by code is necessary, the spreading code used by the spreading unit 24 of each transmission set would differ so as to allow separation.

26 represents a reception unit, which receives signals from a mobile station received via HS-DPCCH or the like, and provides the ACK or NACK signal, CQI, etc. to the control unit 10.

As described above, when an ACK signal is received, the next new data is transmitted, while in the case of a NACK signal or if there is no response within a specific period of time, the control unit 10 performs retransmission control to retransmit the transmitted data. Retransmission is limited to a set maximum number of retransmissions; if the maximum number of retransmission is reached without receiving an ACK signal from the mobile station, the control unit 10 provides control to switch to transmission of the next new data.

In cases where no maximum number of retransmission is defined, it is also possible to start a timer from a new transmission, and switch to transmission of the next new data if a specific time is detected to have elapsed with no ACK signal having been received.

The foregoing was a description of the designations and operation of each unit.

Matters relating to the above-described HSDPA are disclosed for instance in 3rd Generation Partnership Project: Technical Specification Group Radio Access Network; Multiplexing and channel coding (FDD) (3G TS 25.212) and 3rd Generation Partnership Project: Technical Specification Group Radio Access Network; Physical layer procedures (FDD) (3G TS 25.214).

According to the background art described above, by means of the data (Xnd) for discriminating between new transmission and retransmission, a wireless communication device is able to determine whether received data (HS-PDSCH) is a new transmission or retransmission, but errors may occur in this data (Xnd), and being unable to detect a change in Xnd, the next change in Xnd may be erroneously taken to indicate a retransmission.

In particular in the case of a wireless communication device which combines already received data with retransmitted data, if it cannot correctly discriminate between new transmission and retransmission, it will end up making an incorrect combination, leading to a reception error.

Therefore, a need arises to reduce the occurrence of reception errors.

SUMMARY OF THE INVENTION

Besides the aforementioned objective, achieving the effects derived which the various elements of the best mode for practicing the present invention, described below, which effects could not be obtained by the prior art, can also be positioned as an objective of the present invention.

In one embodiment of the present invention, a wireless communication device comprises a storage unit operable to store received data and a decoding unit operable to obtain a first decoding result by decoding new received data, which is not combined with the stored received data, and operable to obtain a second decoding result by decoding the new received data, which is combined with the stored received data.

In one aspect of this embodiment, the wireless communication device further comprises an error detection unit operable to perform error detection on both the first decoding result and the second decoding result and a selection unit operable to selects a decoding result which has no error, when the error detection result of the error detection unit indicates that only one of the decoding results has no error. The wireless communication device further comprises an error detection unit operable to perform error detection on both the first decoding result and the second decoding result and a selection unit operable to, selects a more likely decoding result based on a separately received control signal when the error detection result of the error detection unit indicates that neither of the decoding results has an error. The wireless communication device further comprises a receiving device operable to receive a signal providing notification of either new transmission or retransmission and a storage control unit operable to evaluate whether a transmission is a new transmission or a retransmission based on the notification, and, when the transmission is determined to be a new transmission, operable to cause said new received data to be stored, and when the transmission is determined to be a retransmission, operable to cause the new received data to be stored after combining it with the stored received data. The Wireless communication device further comprises a receiving device operable to receive a signal providing notification of either new transmission or retransmission, wherein the decoding unit is controlled such that, when the transmission is determined to be new transmission based on the notification, it is operable to execute decoding to obtain the second decoding result if an error is detected in the first decoding result, and to not execute decoding to obtain the second decoding result when no error is detected in the first decoding result. The wireless communication device further comprises a receiving device operable to receive a signal providing notification of either new transmission or retransmission, wherein said decoding unit is controlled such that, when the transmission is determined to be a retransmission based on said notification, it is operable to execute decoding to obtain the first decoding result if an error is detected in the second decoding result, and to not execute decoding to obtain the first decoding result when no error is detected in the second decoding result.

In one embodiment of the present invention, a wireless communication device for receiving a data block containing a plurality of separately coded data blocks, comprises a decoding unit operable to perform decoding of M (a natural number no less than 2) coded data blocks within a specific period of time, a storage unit operable to store received data, and a control unit operable to detect that the received data block contains N (a natural number one half of M or less) coded data blocks, wherein said control unit, upon performing said detection, controls said decoding unit to obtain a first decoding result by decoding the new received data, which is not combined with said stored received data, and to obtain a second decoding result by decoding said new received data, which is combined with said stored received data.

In one aspect of this embodiment, a wireless communication device further comprises a plurality of decoding units or a high speed decoding unit for performing decoding of M coded data blocks with said specified period of time.

DETAILED DESCRIPTION OF THE PREFERRED EMBODIMENTS

The communication device of the present invention makes it possible to reduce the occurrence of reception errors.

Below, embodiments of the present invention will be described with reference to the drawings.

Description of First Embodiment

As described above, while there are cases where a new transmission and a retransmission may be confused, the present embodiment will decode received data not combined with already received stored data, as well as decoding received data combined with already received stored data.

A mobile station in a W-CDMA (UMTS) communication system compatible with the above-described HSDPA will be described as an example communication device. This can also be applied to communication devices in other communication systems.

Figure 4:
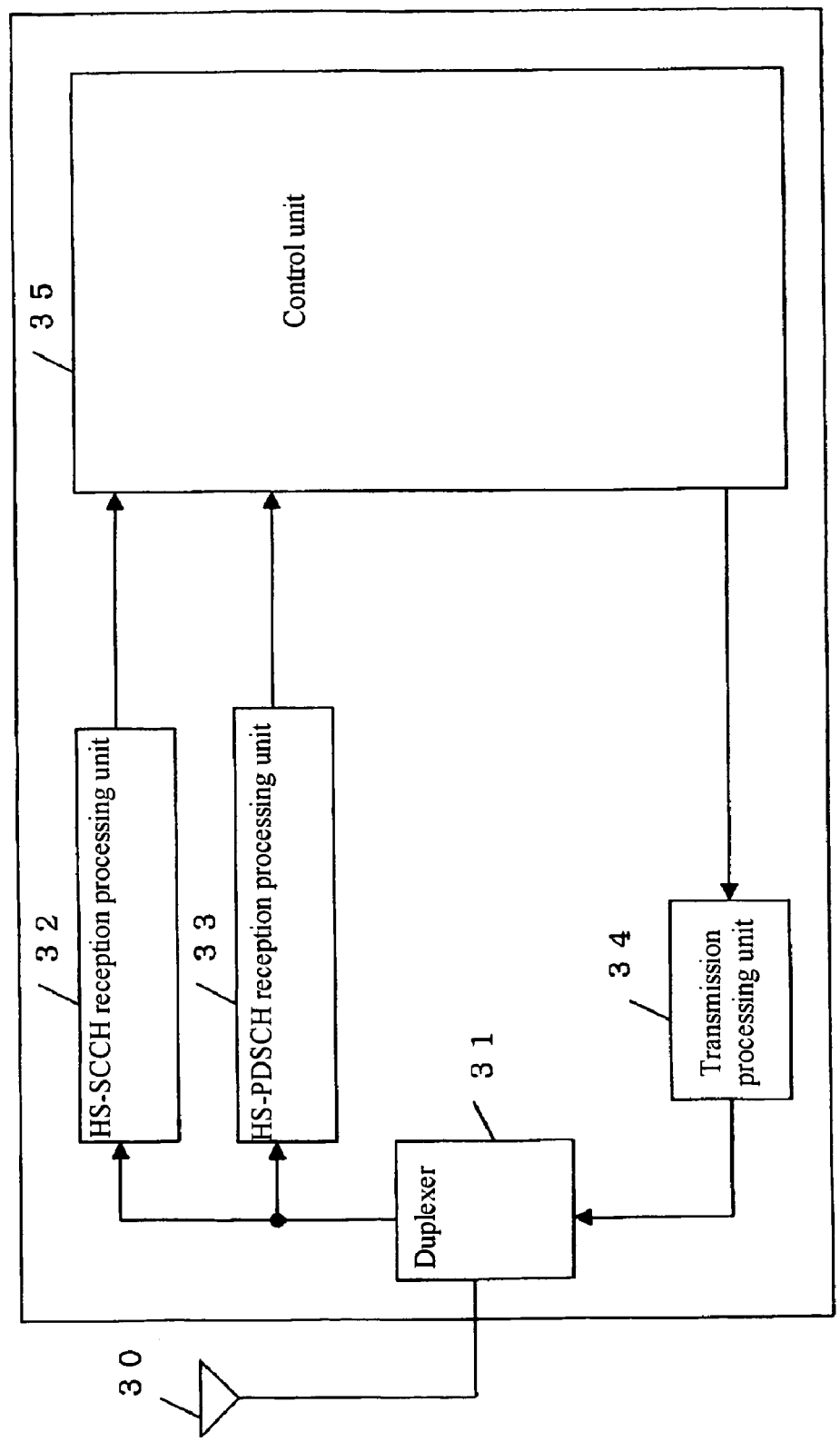
FIG. 4 illustrates a communication device (mobile station) according to the present invention.

In FIG. 4, 30 is an antenna, 31 is a duplexer for sharing the antenna 30 for transmission and reception, 32 is an HS-SCCH reception processing unit; 33 is an HS-PDSCH reception processing unit; 34 is a transmission processing unit which performs transmission on HS-DPCCH and the like, and 35 is a control unit which controls the various units. Control unit 35 has a reordering function for reordering received data blocks based on TSNs (transport sequence numbers) contained in the received data blocks, and an RLC layer processing function for processing data blocks after they have been reordered.

Next, the operation of the wireless device (mobile station) illustrated in FIG. 4 will be described.

The signal transmitted from a wireless base station (cf. FIGS. 1 through 3) is received by the antenna 30 of the mobile station.

The signal received by antenna 30 is inputted into the HS-SCCH reception processing unit 32 and the HS-PDSCH reception processing unit 33.

While the mobile station also has reception processing units to perform reception processing of other channels, description thereof will be omitted here.

For HS-SCCH, the previously described HS-SCCH is received, and decoding such as Viterbi decoding is performed on it to detect whether the transmission was addressed to this station.

Here, if it is detected that the transmission was address to this station, namely detected that the path-metric value is small, information such as the Xccs and Xms contained in the first part, which will be necessary for reception processing of HS-PDSCH, which is delayed by two slots, is provided to the control unit 35.

Based on the provided information, such as the Xccs and Xms, the control unit 35 sets the parameters of demodulation, despreading, and the like, for the HS-PDSCH reception processing unit 33.

Namely, the despreading code set notified in Xccs is given to the HS-PDSCH reception processing unit 33, and control is provided to perform demodulation and the like according to the modulation scheme (QPSK, 16-QAM) notified in Xms.

Furthermore, for HS-SCCH, decoding is also carried out on the second part, extracting information such as the Xtbs, Xhap, Xrv and Xnd, which is provided to the HS-PDSCH reception processing unit 33.

The HS-PDSCH reception processing unit 33 executes processing such as decoding according to the information contained in the second part.

Figure 5:
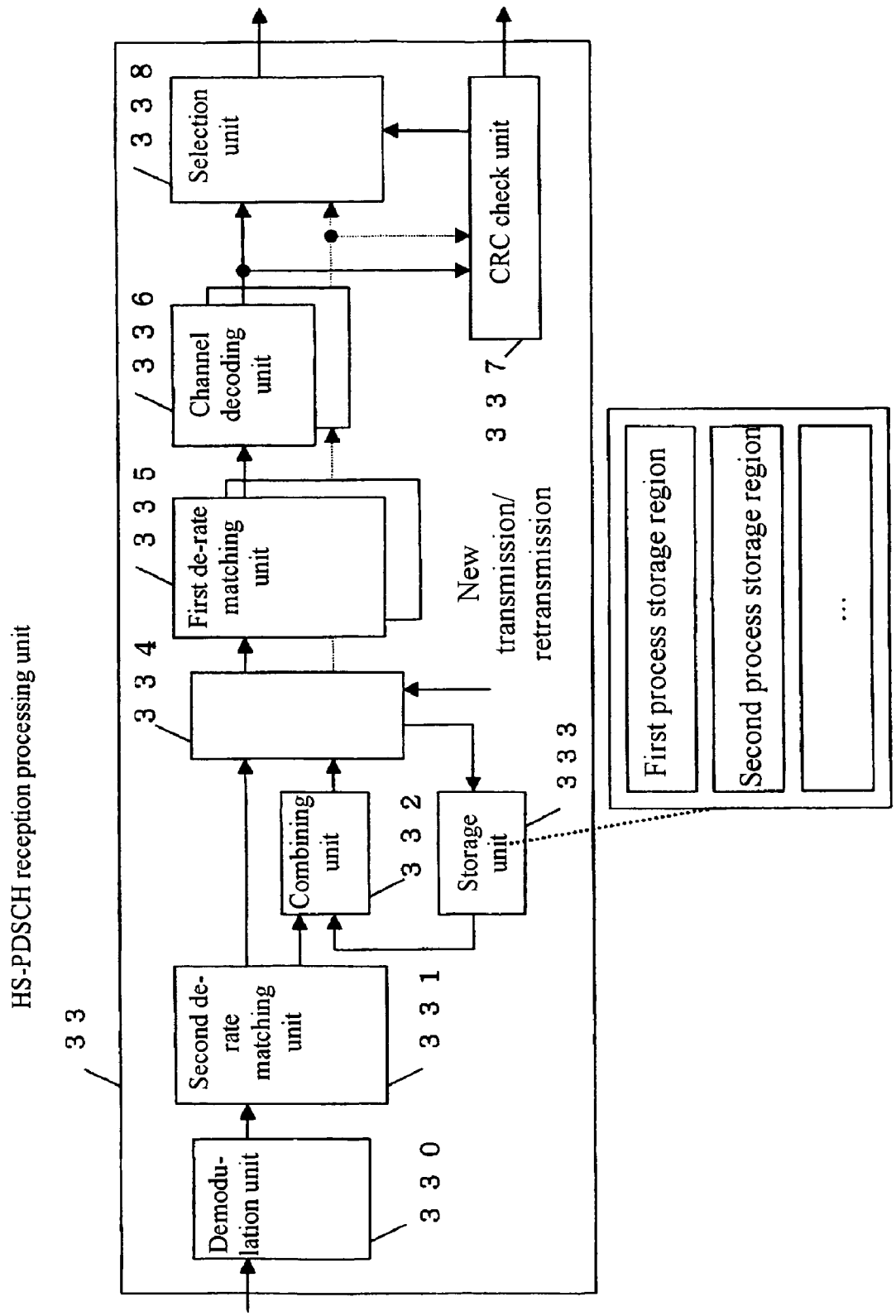
FIG. 5 illustrates an HS-PDSCH reception processing unit.

The HS-PDSCH reception processing unit 33, as shown in FIG. 5, comprises a demodulating unit 330, a second de-rate matching unit 331, combining unit 332, storage unit 333, storage control unit 334, first de-rate matching unit 335, channel decoding unit 336, CRC checking unit (an example of an error detection unit) 337 and selection unit 338.

The demodulating unit 330 executes demodulation, including despreading and the like, according to the information notified in the first part, as described above.

Furthermore, the second de-rate matching unit 331 executes processing corresponding to the opposite of the second rate matching performed by the wireless base station (the processing of the second rate matching unit 18), based on the Xrv notified in the second part. When the transmission is carried out with a plurality of spreading codes, multiplexing thereof is performed at the same time.

The output of the second de-rate matching unit 331 is provided to the storage control unit 334 and combining unit 332.

The combining unit 332 reads already received data stored in the storage unit 333 and combines it with received data from the second de-rate matching unit 331 (the combining being carried out as an element of H-ARQ processing).

If the control unit 35 detects that this is a new transmission based on Xnd, the storage control unit 334 receives notification thereof and causes received data from the second de-rate matching unit 331 to be stored in the storage unit 333.

Furthermore, if the control unit 35 detects that this a retransmission based on Xnd, the storage control unit 334 receives notification thereof and performs control to cause combined data from the combining unit 332 to be stored in the storage unit 333.

Since combining needs to be performed separately for each process notified by Xhap, a different storage region is secured for each process in the storage unit 332. Namely, when notified by means of Xhap that this is the first process, the received data is stored in a first process storage region, and when notified by means of Xhap that this is the second process, the received data is stored in a second process storage region.

The storage control unit 334 furthermore outputs the inputted data directly to the first de-rate matching unit 335. Regarding the processing route from the storage control unit 334 to, the selection unit 338, the processing route for received data not combined with stored data of the storage unit 333 (non-combined data) is shown by a solid line (top side), while the processing route for received data combined in the combining unit 332 with stored data of the storage unit 333 is indicated by a dotted line (bottom side). For simplicity's sake, these will be referred to below as non-combined data and combined data respectively.

Figure 3:
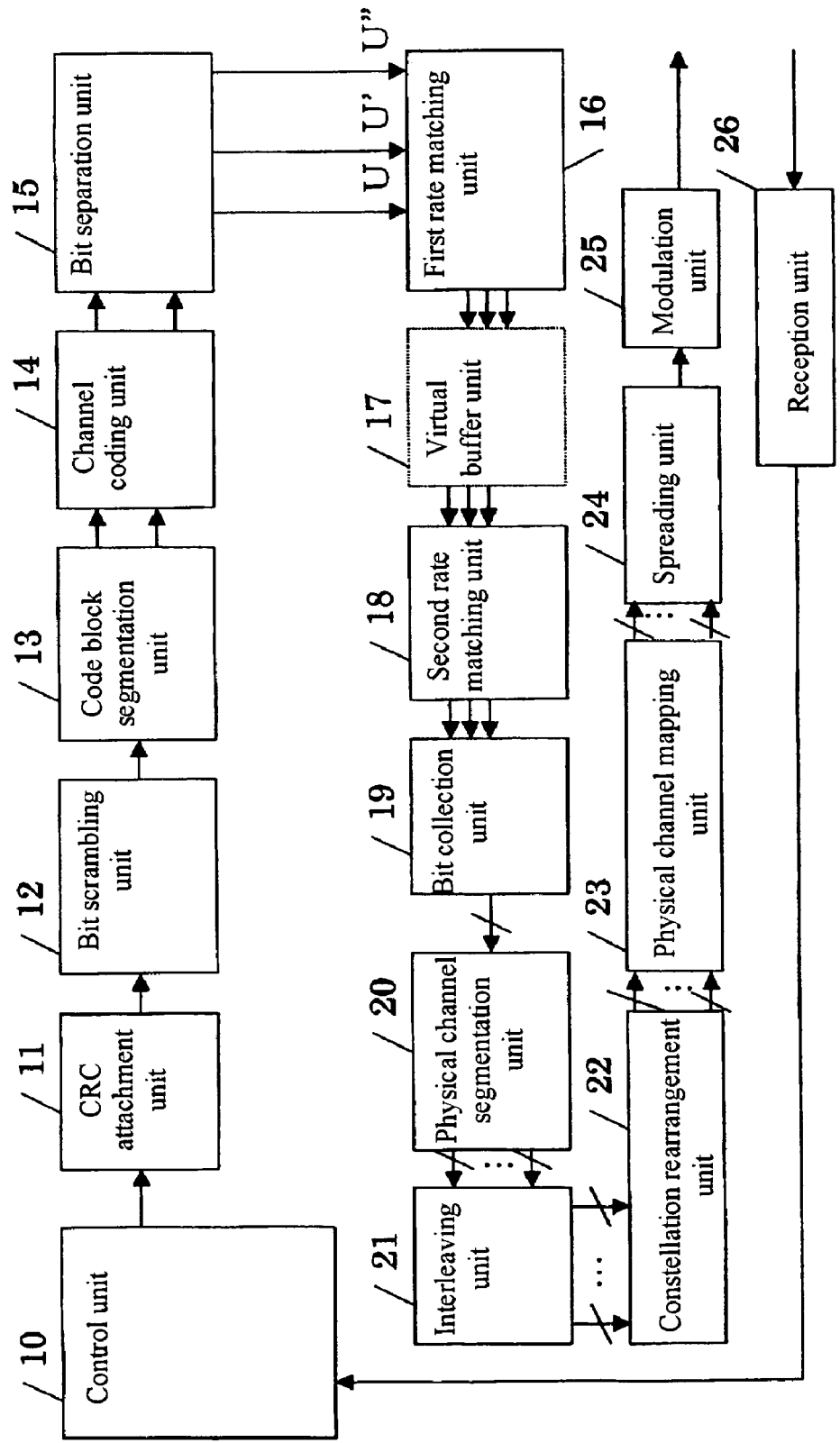
FIG. 3 illustrates a transmission device (wireless base station)

In the first de-rate matching unit 335, these non-combined data and combined data are subjected to processing that is the reverse of the first rate matching performed in the wireless base station of FIG. 3, and the results thereof are outputted to the channel decoding unit 336.

The channel decoding unit 336 performs decoding (e.g., turbo decoding) on the non-combined data and the combined data which have undergone de-rate matching, and outputs the decoding results to the CRC checking unit 337 and selection unit 338.

The CRC checking unit performs error detection processing on both the non-combined data decoding result and the combined data decoding result, using the CRC bit contained in each of them.

If the result of this is that only one of the decoding results has no error, then the selection unit 338 is controlled so as to output only the decoding result which was determined to have no error, and the control unit 35 is informed that there was no CRC error and notified about which decoding result was selected.

Furthermore, if both decoding results have no error, the control unit 35 is informed that there was no CRC error. The control unit controls the selection unit 338 to output the non-combined data decoding result when the transmission was detected to be a new transmission based on the received Xnd, and to output the combined data decoding result when the transmission was detected to be retransmission based on the received Xnd.

Furthermore, when both decoding results have an error, the control unit 35 is informed that there was a CRC error, and the selection unit 338 is controlled so as not to output any decoding result to the control unit 35.

The control unit 35 receives the data obtained by decoding HS-PDSCH and the CRC check result from the selection unit 338 and the CRC checking unit 337, generates a NACK signal if there was a CRC error or an ACK signal if there was no CRC error, and provides it to the transmission processing unit 34.

Figure 1:
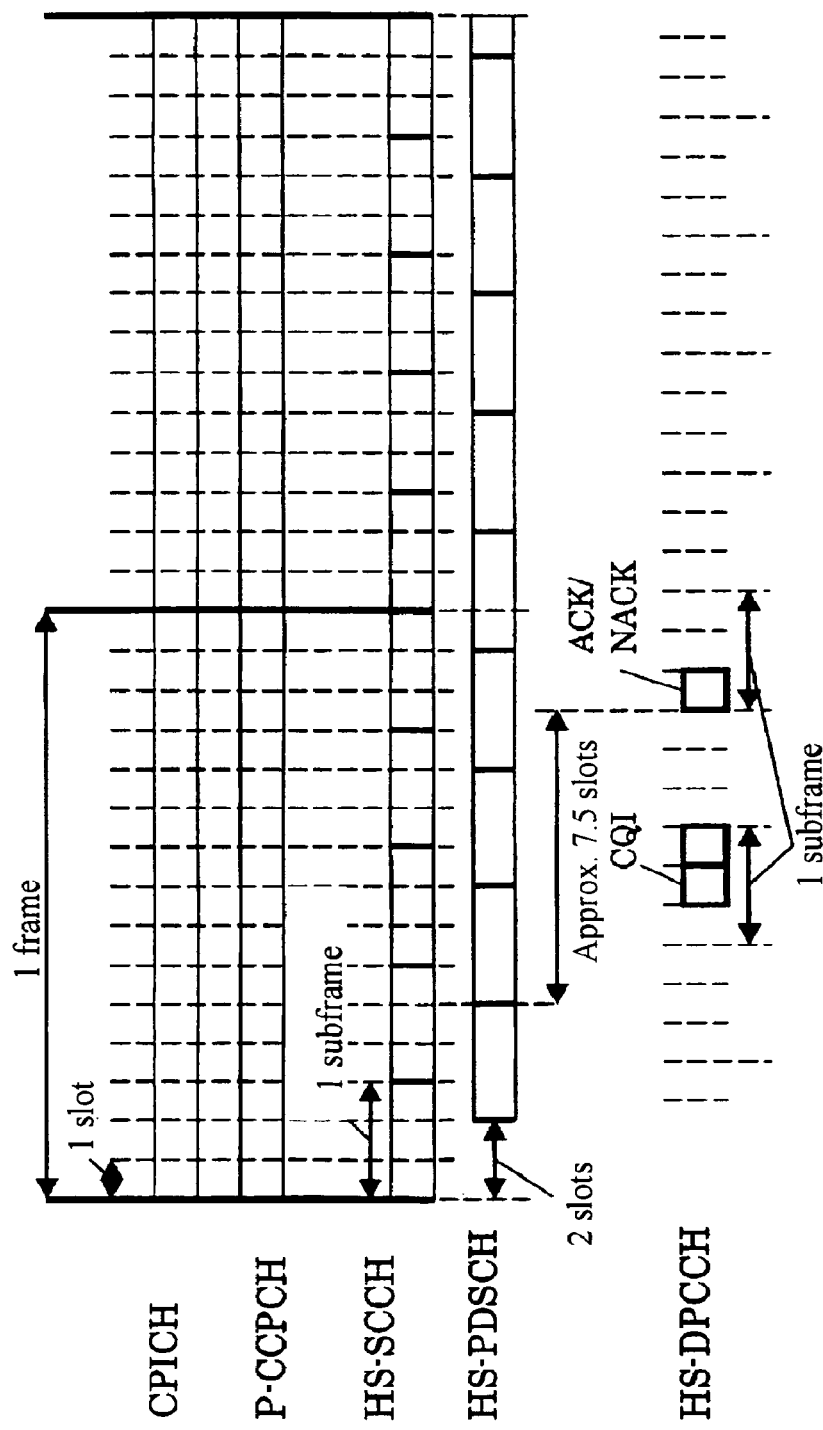
FIG. 1 illustrates the channel arrangement of HSDPA.
Figure 2:
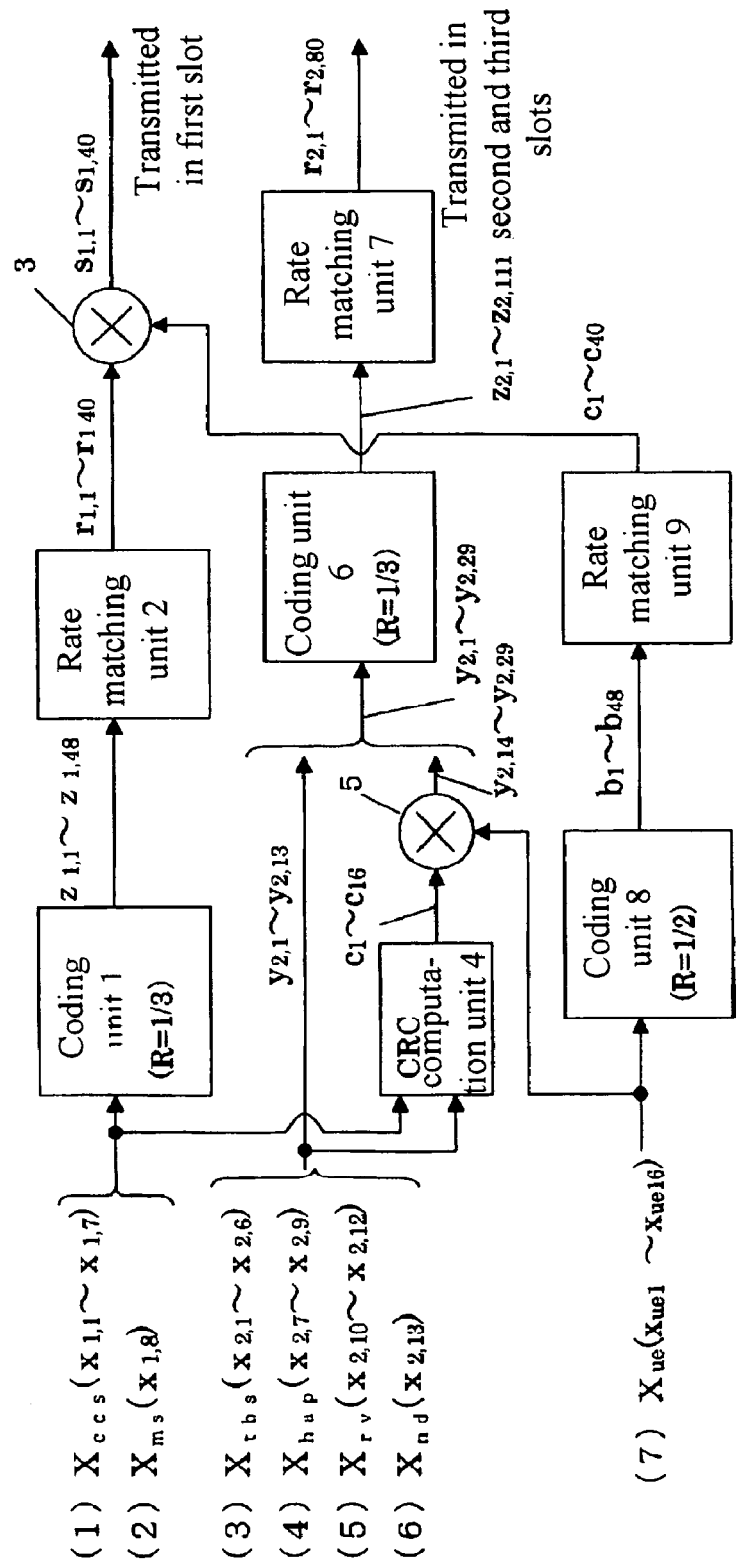
FIG. 2 illustrates the HS-SCCH coding unit.

The transmission processing unit 34 transmits these signals in the corresponding slot illustrated in FIG. 1.

Furthermore, the control unit 35 measures the CPICH reception environment (e.g., measures the SIR) by means of an unillustrated reception processing unit, generates CQI information according to the result of that measurement, and provides it to the transmission processing unit 34. The transmission processing unit 34 transmits the CQI information periodically in the slot illustrated in FIG. 1. According to this CQI information, if the reception environment is good, the base station performs adaptive control to increase the transmission speed, and if the reception environment is not good, it performs adaptive control to reduce the transmission speed, as was described previously.

In the present embodiment, if only one of the decoding results had no error, the CRC checking unit 337 notifies the control unit 35 of which decoding result was determined to have no error.

The control unit 35 can thereby detect if the result it was notified of contradicts the determination of new transmission/retransmission using Xnd, making it possible to detect at least that either the previous Xnd or the current Xnd evaluation result was erroneous.

As described above, by decoding new received data not combined with already received stored data as well as decoding new received data combined with already received stored data, the present embodiment makes it possible to use the decoding result which has no error even in case of confusion between new transmission and retransmission.

Description of Second Embodiment

In the example described above, the order of decoding the non-combined data and combined data is not specified, it being permissible to process them in parallel or to decode either one first.

However, in the second embodiment, the order of decoding is defined. This prevents useless decoding and reduces processing load.

Namely, when the control unit 35 determines that new data has been transmitted based on Xnd, the channel decoding unit 336 first executes decoding of non-combined data.

A CRC check is then performed on the non-combined data decoding result by the CRC check unit 337, and if a CRC error is detected, the channel decoding unit 336 performs decoding of the combined data, and a CRC check is similarly performed on it by the CRC checking unit 337. Then, if the combined data decoding result has no CRC error, that combined data decoding result is outputted by the selection unit 338, while if there was a CRC error, the selection unit 338 does not output anything.

On the other hand, if a CRC check is performed by the CRC checking unit 337 on the non-combined data decoding result and no CRC error is detected, then the channel decoding unit 336 does not perform decoding of the combined data. In this case, the non-combined data decoding result would be outputted from the selection unit 338.

There are of course also cases where the control unit 35 will determine that retransmission data has been transmitted based on Xnd. In such a case, the channel decoding unit 336 can first execute decoding of the combined data, and if there was a CRC error, then the non-combined data can be decoded and checked for CRC error. Here, if the combined data decoding result has no CRC error, decoding of the non-combined data is not carried out.

Controlling the order of decoding as described above reduces the processing load on the channel decoding unit 336. Furthermore, power consumption can be reduced by turning off the power supply to the decoding unit when it is not performing decoding or the like.

Description of Third Embodiment

In this embodiment, it will noted that, as described using FIG. 3, the wireless base station divides the data into segments in a code block segmentation unit 13 according to the transport block size, each of which is separately (turbo) coded by the channel coding unit 14.

Namely, when transport block size is too large, the data is divided and coded in M (a natural number no less than 2) systems.

Furthermore, the mobile station needs to have a channel decoding unit 356 which has the ability to complete decoding of one subframe within the time period before the decoding of the next subframe needs to be started (i.e., a specific time period for which the decoding unit 355 can be seized).

That is, the channel decoding unit 356 has the ability to process M coded blocks within this specific period of time.

Thus, the control unit 35 of the mobile station computes how many systems (here, assumed to be N) the data was divided and coded in by the base station based on the transport block size notified by means of the Xtbs of HS-SCCH, using the same algorithm as the base station. If N is a natural number no greater than the quotient of M÷2, the decoding unit 336 is allowed to perform decoding on both the non-combined data and combined data of the second embodiment.

Assuming the bit length subject to turbo coding is 5114 bits, the remainder of the number indicated by the transport block size divided by 5114 bits will be the number (N) of blocks segmented into by the base station. By storing the value M (or the quotient of M/2) in advance, the mobile station can simply determine whether N is a natural no greater than the value of the quotient of M÷2 or not.

In order to perform decoding of M coded data blocks within a specific period of time, a plurality of decoding units (e.g., M turbo decoding units) may be provided, or a decoding unit may be used which quickly executes decoding of M coded blocks in time-sharing fashion within the specified period of time.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A wireless communication device comprising:
   a storage unit operable to store received data;
   a decoding unit operable to execute both of a first process that obtains a first decoding result by decoding new received data, which is not combined with stored received data, and a second process that obtains a second decoding result by decoding data generated by combining the same new received data and the stored received data, wherein the second process is performed in parallel with the first process; and
   a receiving device operable to receive a signal providing notification of either a new transmission or a retransmission; wherein the decoding unit is controlled such that, when the transmission is determined to be new transmission based on the notification, it is operable to execute decoding to obtain the second decoding result if an error is detected in the first decoding result, and to not execute decoding to obtain the second decoding result when no error is detected in the first decoding result.

2. A wireless communication device according to claim 1, further comprising:

an error detection unit operable to perform error detection on both the first decoding result and the second decoding result; and a selection unit operable to select a decoding result which has no error, when the error detection result of the error detection unit indicates that only one of the decoding results has no error.

3. A wireless communication device according to claim 1, further comprising:

an error detection unit operable to perform error detection on both the first decoding result and the second decoding result; and a selection unit operable to select a more likely decoding result based on a separately received control signal when the error detection result of the error detection unit indicates that neither of the decoding results has an error.

4. A wireless communication device according to claim 1, further comprising:

a storage control unit operable to evaluate whether a transmission is a new transmission or a retransmission based on the notification, and, when the transmission is determined to be a new transmission, operable to cause said new received data to be stored, and when the transmission is determined to be a retransmission, operable to cause the new received data to be stored after combining it with the stored received data.

5. A wireless communication device comprising:

a storage unit operable to store received data;

a decoding unit operable to execute both of a first process that obtains a first decoding result by decoding new received data, which is not combined with stored received data, and a second process that obtains a second decoding result by decoding data generated by combining the same new received data and the stored received data, wherein the second process is performed in parallel with the first process; and a receiving device operable to receive a signal providing notification of either a new transmission or a retransmission; wherein said decoding unit is controlled such that, when the transmission is determined to be a retransmission based on said notification, it is operable to execute decoding to obtain the first decoding result if an error is detected in the second decoding result, and to not execute decoding to obtain the first decoding result when no error is detected in the second decoding result.

* * * * *